United States Patent
Baker et al.

(10) Patent No.: US 6,821,003 B2
(45) Date of Patent: Nov. 23, 2004

(54) VEHICLE LAMP AND VEHICLE ILLUMINATION AND DATA TRANSMISSION SYSTEM INCORPORATING SAME

(75) Inventors: Jay DeAvis Baker, West Bloomfield, MI (US); Lawrence LeRoy Kneisel, Novi, MI (US); Paul Kirk Zoratti, South Lyon, MI (US); Jimmy Attard, Dearborn, MI (US); Andrew Zachary Glovatsky, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/197,275

(22) Filed: Jul. 16, 2002

(65) Prior Publication Data

US 2004/0012973 A1 Jan. 22, 2004

(51) Int. Cl.[7] .................................................. F21V 1/00
(52) U.S. Cl. ........................ 362/464; 362/276; 362/802; 362/539
(58) Field of Search ................................. 362/462, 276, 362/802, 539, 464; 315/77, 82; 340/460

(56) References Cited

U.S. PATENT DOCUMENTS 5,386,348 A    1/1995  O'Shaughnessey et al.
6,550,944 B2 * 4/2003  Kusayaga ................... 362/466

FOREIGN PATENT DOCUMENTS

| DE | 4215940 A1  | 11/1993 |
| DE | 10037217 A1 | 2/2002 |
| EP | 0526424 A3  | 2/1993 |
| EP | 0807830 A1  | 11/1997 |
| EP | 1130416 A3  | 1/2002 |
| FR | 2494534 A   | 5/1982 |

\* cited by examiner

Primary Examiner—Stephen Husar
Assistant Examiner—Anabel Ton
(74) Attorney, Agent, or Firm—Brinks Hofer Gilson & Lione

(57) ABSTRACT

A vehicle lamp that includes an integrated sensor for interacting with an operating environment of a vehicle is provided. The vehicle lamp includes a sensor and a light channel adapted to transmit data received by the sensor. The vehicle lamp can also include a flat wire that has a component integrally formed by the light channel. A vehicle illumination and data transmission system is also provided. The system includes vehicle lamps according to the present invention, and can include sensor processors located within each of a plurality of lamps, or sensor processors that are centrally located within the vehicle. A system processor is connected to the sensor processors and enables operating decisions based upon data received from the environment by the sensors.

17 Claims, 4 Drawing Sheets

VEHICLE LAMP AND VEHICLE ILLUMINATION AND DATA TRANSMISSION SYSTEM INCORPORATING SAME

FIELD OF THE INVENTION

The invention relates generally to lamps used with vehicles to illuminate the environment external to the vehicle. More specifically, the invention relates to lamps that include data sensors for gathering data from the external environment. Also, the invention relates to a vehicle illumination and data transmission system.

BACKGROUND OF THE INVENTION

Vehicles, such as automobiles, typically operate in an environment that includes many variables that may affect the operation of the vehicle. For example, on a typical urban highway, an automobile operates in close proximity to several other automobiles. The driver of the vehicle must continually monitor the surrounding environment and make operational decisions based upon various factors, such as the speed at which adjacent vehicles are traveling.

The ready availability and increasingly complex technological capabilities of various sensors have allowed vehicle manufacturers to begin manufacturing smart vehicles. These vehicles, through the use of a plurality of sensors, have the ability to detect various parameters about the environment in which the vehicle is operating. For example, sensors can detect the relative speed of the vehicles in front of and behind the smart vehicle. An on-board computer can process this information and make decisions that effect the operation of the smart vehicle. For example, if the information indicates that the vehicle in front of the smart vehicle is traveling at a slower rate of speed, the on-board computer can adjust the cruising speed of the smart vehicle to match that of the forward vehicle.

The development of smart vehicles has, however, encountered several difficulties. For example, to obtain a significant quantity of information regarding the vehicle operating environment, it is necessary to use a large number of sensors in the vehicle. The sensors should be protected from harsh conditions, and also should be essentially invisible to the consumer in order to not affect the aesthetic value of the vehicle. This presents packaging issues that require manufacturers to place sensors, and their associated components, into small spaces. Furthermore, many of the operational decisions that can be made based upon information concerning the operating environment require extremely quick data transmission between the sensor and the on-board computer. This presents a need for a vehicle data transmission system that can address a large number of sensors and handle the need for rapid data transmission speeds.

SUMMARY OF THE INVENTION

The present invention provides a vehicle lamp for illuminating an environment external to a vehicle and for relaying data between the vehicle and the environment. The lamp includes a sensor adapted to receive various types of data from the external environment, and also includes a light channel operably connected to the sensor. The light channel is adapted to transmit data away from the sensor and toward an on-board computer. The lamp can also include one or more wires or circuit traces connected to the sensor and a power supply that energizes the sensor. The wire can be a flat wire or flexible circuit, and can also include a non-conductive portion that is integrally formed with the light channel.

In a preferred embodiment, a vehicle lamp according to the present invention comprises a housing that defines an interior chamber and a bulb disposed within the interior chamber. A reflective surface is disposed within the chamber and is adapted to bundle light that is emitted from the bulb and to direct the light out of the housing. A bulb shield is disposed adjacent the bulb and is adapted to substantially prevent light from the bulb from exiting the housing without encountering the reflective surface. Also, the lamp includes the sensor and light channel discussed above.

The present invention also provides a vehicle illumination and data transmission system that incorporates a plurality of vehicle lamps according to the present invention. The system includes a system processor that is adapted to process data received by each sensor from each lamp of the plurality. Also, the system includes at least one sensor processor that is adapted to process data from at least one of the sensors from the plurality of vehicle lamps and to transmit data to the system processor.

In one preferred embodiment, the system includes a plurality of sensor processors, each of which is operably connected to one sensor from one lamp of the plurality of vehicle lamps. Particularly preferable, each sensor processor is operably connected to the system processor by the light channel of the vehicle lamp.

In another preferred embodiment, the sensor processor is centralized such that each sensor from each lamp of the plurality is operably connected to the sensor processor by the light channel.

DETAILED DESCRIPTION OF THE INVENTION

The following description of a preferred embodiment provides an example of the present invention. The embodiment discussed herein is merely exemplary in nature, and is not intended to limit the scope of the invention in any manner. Rather, the description of the preferred embodiment serves to enable a person of ordinary skill in the relevant art to make, use and perform the present invention.

Figure 1:
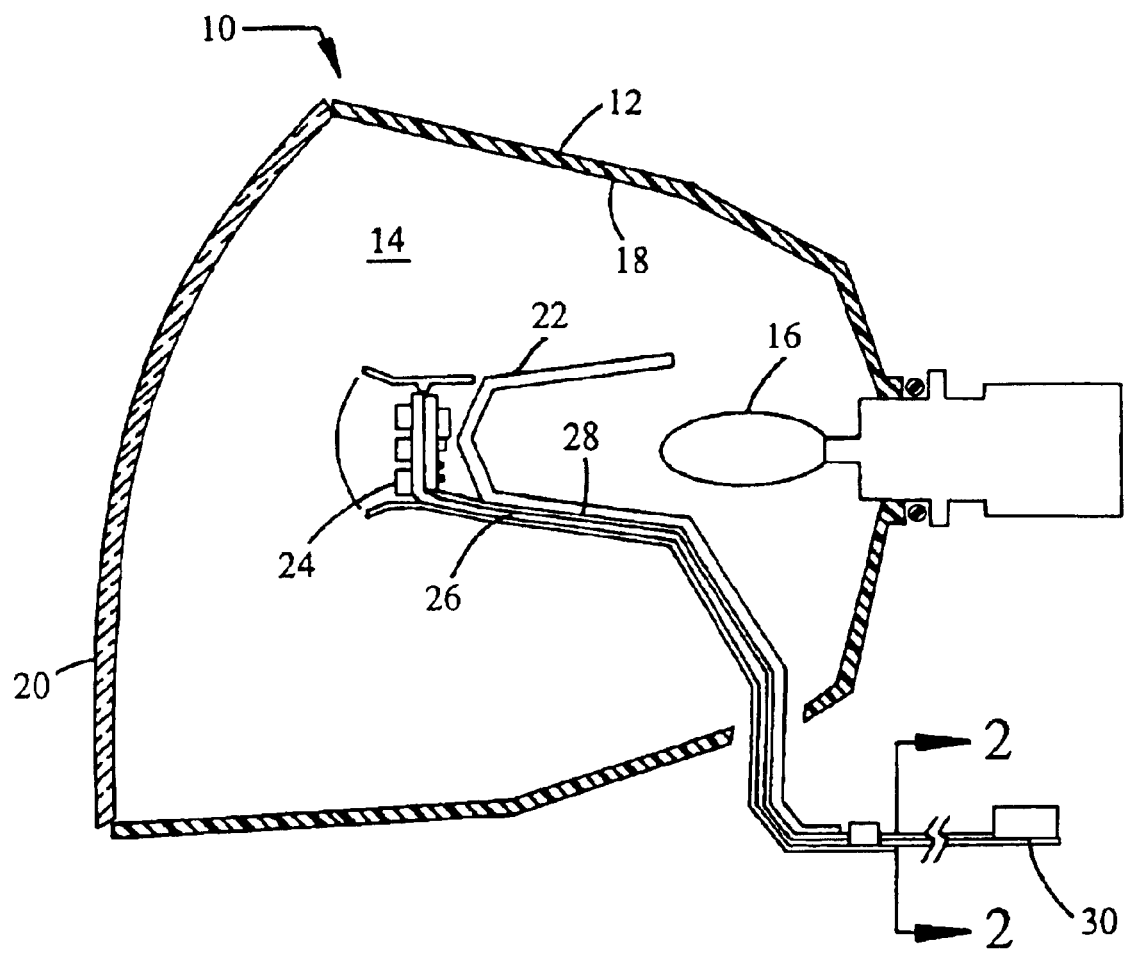
FIG. 1 is a cross-sectional view of a vehicle lamp according to a first preferred embodiment of the present invention.
Figure 2:
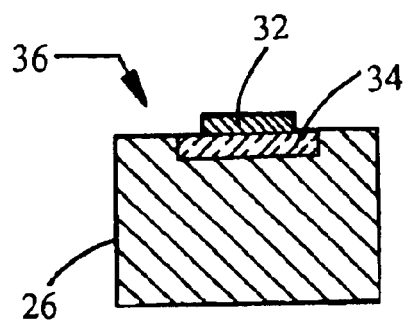
FIG. 2 is a cross-sectional view taken along line 2—2 in FIG. 1.

FIGS. 1 and 2 illustrate a vehicle lamp 10 according to a first preferred embodiment of the present invention. The lamp 10 includes a housing 12 that defines an interior chamber 14. A bulb 16 is disposed within the interior chamber and can be any suitable lamp bulb known to those skilled in the art. The bulb 16 disposed within the interior chamber 14. The bulb 16 is adapted to emit light and can be any suitable bulb known to those skilled in the art. A reflective surface 18 is disposed within the interior chamber 14 and is adapted to bundle light emitted from bulb 16 and direct the light out of the interior chamber 12. Preferably, as illustrated in FIG. 1, the reflective surface 18 defines a series of angulated surfaces. Also preferable, the reflective surface 18 is disposed on the inner side of the housing 12.

The vehicle lamp 10 also includes a lamp face 20 that allows light from bulb 16 to exit the interior chamber 14. A bulb shield 22 is disposed within the interior chamber 14 and adjacent the bulb 16. The bulb shield 22 is adapted to substantially prevent light emitted by the bulb 16 from exiting the interior chamber 14 without encountering the reflective surface 18. The bulb shield 22 preferably has a reflective surface on its interior surface that reflects light back to the reflective surface 18 of the housing 12.

The vehicle lamp 10 also includes a sensor 24. As illustrated in FIG. 1, the sensor 24 is preferably disposed within the interior chamber 14 and adjacent the bulb shield 22. Particularly preferable, the bulb shield 22 is preferably disposed between the bulb 16 and the sensor 24. This positioning protects the sensor 24 from interference due to light and/or heat from the bulb 16. The sensor 24 can be any suitable sensor known to those skilled in the art. Examples of suitable sensors include radar sensors, radiofrequency sensors, infrared sensors, ultrasonic sensors, and laser-based radar sensors.

The vehicle lamp 10 also includes a light channel 26 as operably connected to the sensor 24 and is adapted to transmit data away from the sensor 24. The light channel 26 is a container that has substantially no interference to the transmission of light through the container. Preferably, the light channel 26 comprises an elongated, flexible polymeric member.

The lamp 10 also includes one or more wires or circuit traces. Preferably, the lamp 10 includes a wire 28 operably connected to the sensor 24 and a power supply 30, such as the vehicle battery. To facilitate packaging of the sensor 24 and its connected elements, the wire 28 is preferably a flat wire, i.e., a wire with at least one substantially flat surface, or a flat circuit. As best illustrated in FIG. 2, the wire 28 preferably comprises a conductive component 32, such as a metal member, and a non-conductive component 34, such as a polymeric material. Particularly preferable, the non-conductive component 34 is integrally formed by the light channel 26, thereby creating a light channel/wire assembly 36.

The lamp 10 also preferably includes a processor 38 adapted to convert data received by the sensor 24 into a light waveform suitable for transmission along the light channel 26.

Figure 3:
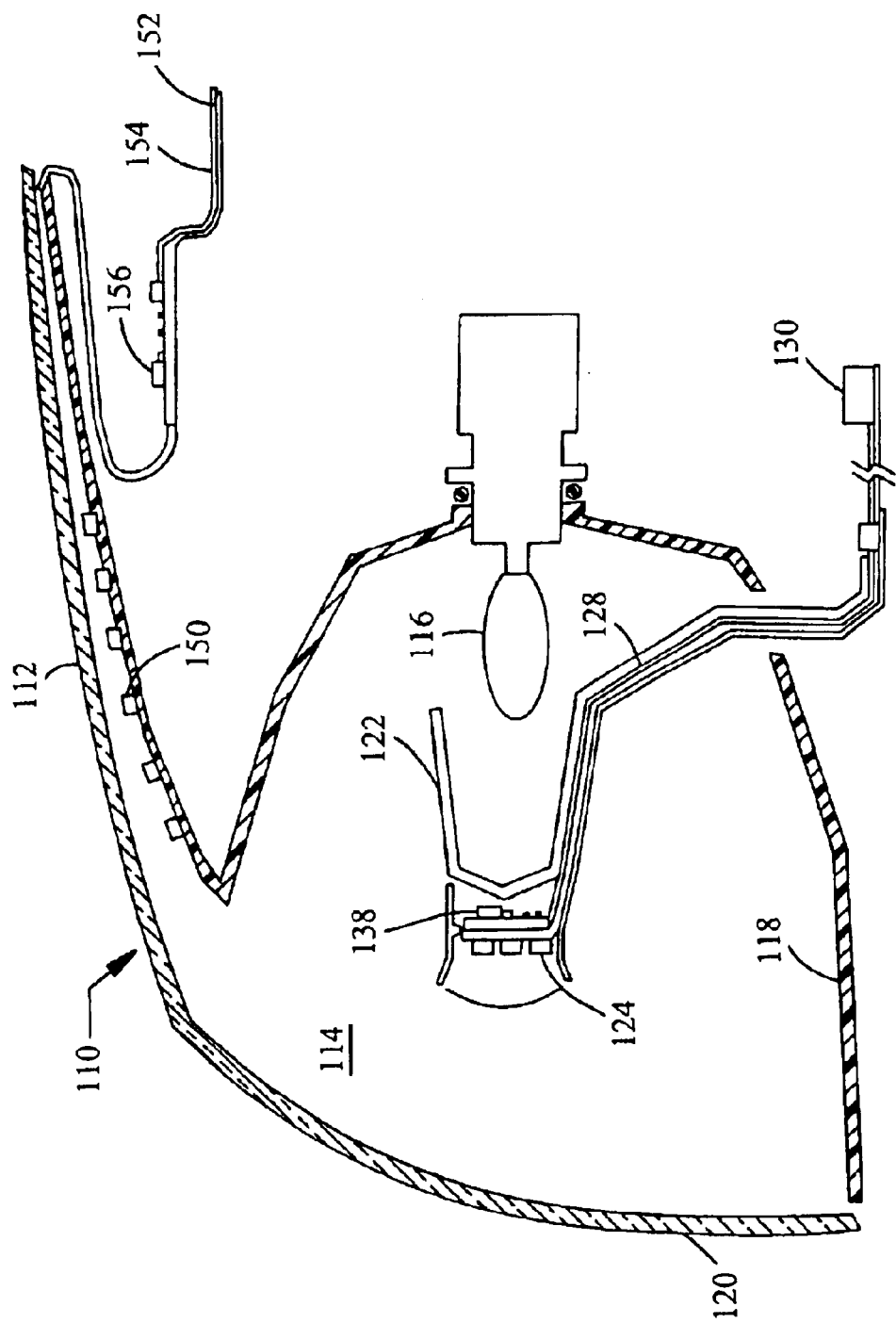
FIG. 3 is a cross-sectional view of a second preferred embodiment of a vehicle lamp according to the present invention.

FIG. 3 illustrates a vehicle lamp 110 according to a second preferred embodiment of the present invention. This embodiment is similar to the first preferred embodiment except as detailed below. Accordingly, the vehicle lamp 110 includes a housing 112 that defines an interior chamber 114, a bulb 116 adapted to emit light, a reflective surface 118 disposed within the interior chamber 114 and adapted to bundle light from the bulb 116 and direct it out of the interior chamber 114, a lamp face 120, a bulb shield 122 positioned adjacent the bulb 116, and a sensor 124. Also, a light channel 126 is operably connected to the sensor 124 and is adapted to transmit data away from the sensor 124. A wire 128 is operably connected to the sensor 124 and a power supply 130. The vehicle lamp 110 further includes a processor 138 adapted to convert data received by the sensor 124 from the vehicle operating environment into a light waveform suitable for transmission along the light channel 126.

In this embodiment, the vehicle lamp 110 includes an antenna 150 disposed within the interior chamber 114. The antenna 150 is a conventional antenna capable of receiving data from the external environment, and preferably comprises a phase array antenna as illustrated in FIG. 3. Also as illustrated in FIG. 3, the antenna 150 is preferably positioned in an upper portion of the vehicle lamp 110 such that the antenna faces upward when the vehicle lamp 110 is put into its final position in the vehicle. This positioning provides exposure of the antenna 150 to the environment above the vehicle during operation.

As illustrated in FIG. 3, the vehicle lamp also preferably includes a second light channel 152, second wire 154, and second processor 156. Each of these components is preferably similar to those described above for the first preferred embodiment. Thus, the second wire 154 preferably comprises a flat wire having a conductive component, such as a metal wire having at least one flat surface, and a non-conductive component integrally formed by the second light channel 152. Also, the second processor 156 is preferably adapted to convert data received by the antenna 150 from the external environment into a light waveform suitable for transmission along the second light channel 152.

Figure 4:
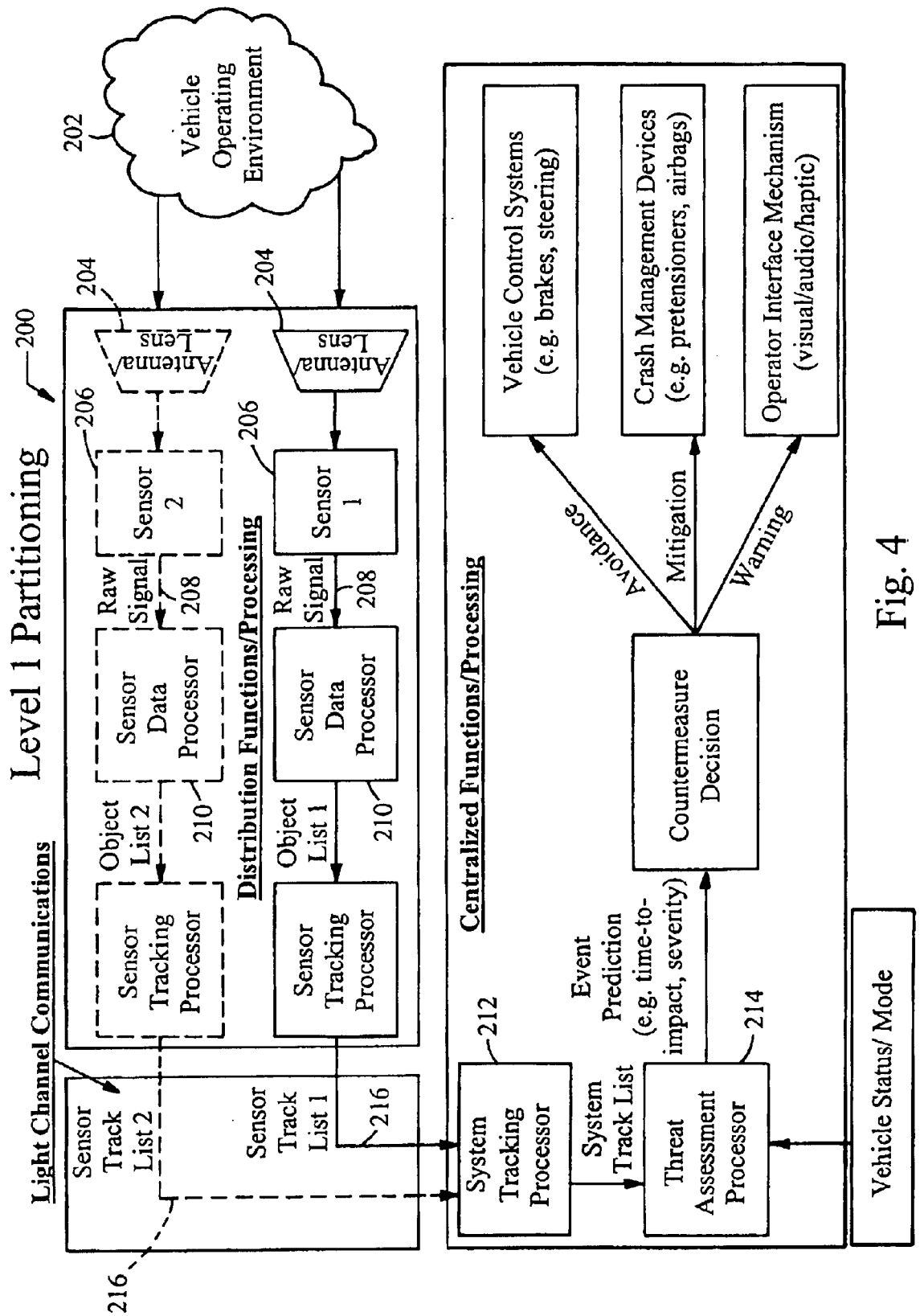
FIG. 4 is a block diagram illustrating a first preferred embodiment of a vehicle illumination and data transmission system according to the present invention.

FIG. 4 illustrates a block diagram of a vehicle illumination and data transmission system 200 according to a preferred embodiment of the present invention. The system 200 is mounted in a vehicle (not illustrated, in FIG. 4) and allows the vehicle to interact with the vehicle operating environment 202. The system 200 preferably comprises a plurality of vehicle lamps 204 according to the present invention. As discussed above, the lamps 204 include a sensor 206 adapted to receive data from the vehicle operating environment 202. The sensors 206 output a raw signal 208 to a sensor processor 210 that is adapted to process data from at least one of the sensors 206 and subsequently transmit data further down the system. The system 200 also includes a system processor 212 which is adapted to process data received from each of the sensors 206 via the sensor processors 210. The system processor 212 is adapted to process this data and either make operating decisions based upon the data or transmit the data to another processor, such as a threat assessment processor 214, to make such decisions. Examples of decisions that can be made by the system processor 212 or the threat assessment processor 214 include avoidance decisions, such as braking and steering, mitigation decisions, such as activation of pretensioners and air bags, and warning decisions, such as visual and/or audio feedback to the operator of the vehicle.

In this preferred embodiment, each sensor 206 has a sensor processor 210 associated with it. Light channels 216 connect each sensor processor 210 to the system processor 212.

Figure 5:
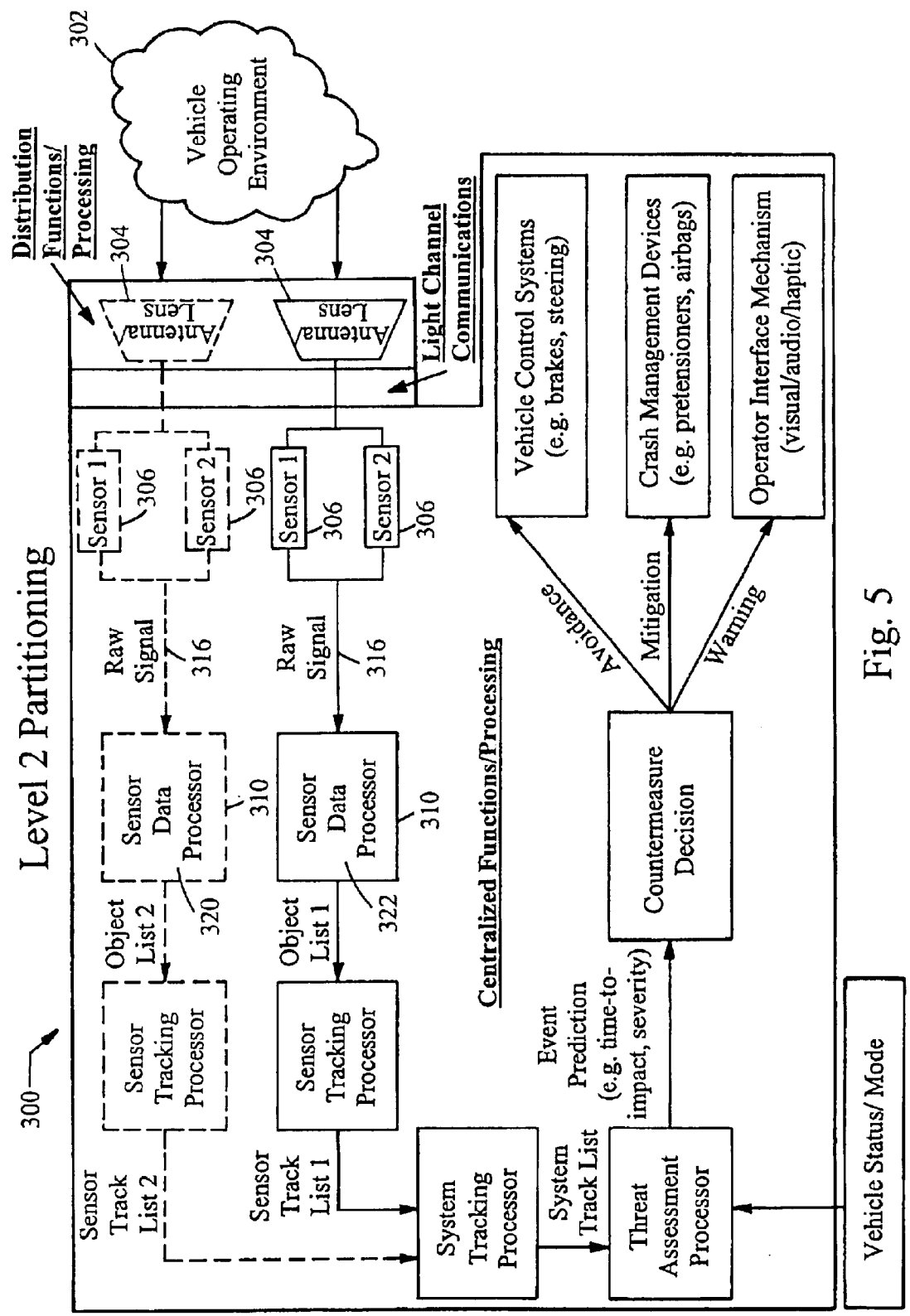
FIG. 5 is a block diagram of a second preferred embodiment of the vehicle illumination and data transmission system according to the present invention.

In this embodiment, each vehicle lamp 204 must contain sensor and processor electronics. In some applications, it may be desirable to centralize some of the processing functions. The present invention provides another preferred embodiment of a vehicle illumination and data transmission system that enables such centralization of processing equipment and functions. FIG. 5 illustrates a block diagram of this preferred embodiment. In this embodiment, the system 300, includes a plurality of vehicle lamps 304 that have sensors 306 that enable interaction with the vehicle operating environment 302. The lamps 304 do not include sensor processors. Rather, sensor processors 310 are centrally located within the vehicle and a plurality sensors 306 are operably connected to each sensor processor 310 via light channels 316. Preferably, first 320 and second 322 sensor processors are utilized. Each of these sensor processors 320, 322 is connected to a plurality of sensors 306 within vehicle lamps 304. Light channels 316 operably connect each group of sensors 306 to the appropriate sensor processor 320, 322. This centralization of sensor processor equipment and functions allows for reduced costs associated with manufacturing the vehicle lamps 304 because the lamps 304 do not include the sensor processor 310. Furthermore, a smaller number of sensor processors 310 are needed for the entire system 300.

The foregoing disclosure includes the best mode devised by the inventor for practicing the invention. It is apparent, however, that several variations in the present invention may be conceivable by one skilled in the art. In as much as the foregoing disclosure is intended to enable one skilled in the pertinent art to practice the instant invention, it should not be construed to be limited thereby, but should be construed to include such aforementioned variations.

What is claimed is:

1. A vehicle lamp for illuminating an environment external to the vehicle and for relaying data between the vehicle and the environment, the vehicle lamp comprising:
   a housing defining an interior chamber;
   a bulb disposed within said interior chamber and adapted to emit light;
   a reflective surface disposed within said interior chamber and adapted to bundle said light and direct said light out of said interior chamber;
   a bulb shield disposed adjacent said bulb and adapted to substantially prevent said light from exiting said interior chamber without encountering said reflective surface;
   a sensor disposed within said interior chamber and adapted to receive the data from the external environment, the sensor positioned adjacent the bulb shield; and
   a light channel operably connected to said sensor and adapted to transmit the data away from said sensor.

2. The vehicle lamp of claim 1, wherein said bulb shield is positioned between said sensor and said bulb.

3. The vehicle lamp of claim 1, wherein said sensor is a member selected from the group consisting of radar sensors, radio frequency sensors, infrared sensors, ultrasonic sensors, and laser-based radar sensors.

4. The vehicle lamp of claim 1, further comprising a processor adapted to convert the date received by said sensor from the external environment into a light waveform suitable for transmission along said light channel.

5. The vehicle lamp of claim 1, wherein said sensor is further adapted to transmit the data to the external environment; and
   further comprising a processor adapted to convert the data from a light waveform suitable for transmission along said light channel into a different form suitable for transmission to the external environment by said sensor.

6. The vehicle lamp of claim 1, further comprising a wire operably connected to said sensor and a power supply;
   wherein said wire is adapted to transmit electrical power from said power supply to said sensor.

7. The vehicle lamp of claim 6, wherein said wire is a flat wire.

8. The vehicle lamp of claim 7, wherein said flat wire includes a conductive portion and a non-conductive portion; and
   wherein said non-conductive portion is integrally formed by said light channel.

9. A vehicle illumination and data transmission system, comprising:
   a plurality of vehicle lamps, each vehicle lamp of said plurality comprising a housing, a bulb disposed within said housing, and adapted to emit light, a reflective surface adapted to bundle said light, a bulb shield disposed adjacent said bulb, a sensor disposed within said housing and adapted to receive data from an external environment, and a light channel operably connected to said sensor and adapted to transmit the received data away from said sensor;
   a system processor adapted to process data from received by each sensor from said plurality of vehicle lamp; and
   a plurality of sensor processors adapted to process data from the plurality of sensors of said plurality of vehicle lamps and transmit data to said system processor.

10. The vehicle illumination and data transmission system of claim 9, wherein each of said plurality of sensor processors is operably connected to one of said sensors of said plurality of vehicle lamps.

11. The vehicle illumination and data transmission system of claim 10, wherein each of said plurality of sensor processors is disposed within one of said housings of said plurality of vehicle lamps.

12. The vehicle illumination and data transmission system of claim 9, wherein said at least one sensor processor comprises a single sensor processor; and
   wherein each of said light channels of said plurality of vehicle lamps operably connects one of said sensor to said sensor processor.

13. The vehicle illumination and data transmission system of claim 9, wherein said at least one sensor processor comprises first end second sensor processors;
   wherein said plurality of vehicle lamps comprises first and second groups of vehicle lamps;
   wherein each of said light channels of said first group of vehicle lamps operably connects one of said sensors to said first sensor processor; and
   wherein each of said light channels of said second group of vehicle lamps operably connects one of said sensors to said second sensor processor.

14. The vehicle illumination and data transmission system of claim 9, wherein each of said plurality of vehicle lamps comprises a wire operably connected to said sensor and a power supply;
   wherein said wire is adapted to transmit electrical power from said power supply to said sensor;
   wherein said wire includes a conductive portion and a non-conductive portion; and
   wherein said non-conductive portion is integrally formed by said light channel.

15. A vehicle illumination and data transmission system, comprising:
   a plurality of vehicle lamps, each lamp of said plurality comprising a housing, a bulb disposed within said housing and adapted to emit light, a reflective surface adapted to bundle said light, a bulb shield disposed adjacent said bulb, a sensor disposed within said housing and adapted to receive data from an external environment, a sensor processor adapted to process data received by said sensor, a light channel adapted to transmit the processed data away from said sensor, and a wire operably connected to said sensor and a power supply adapted to transmit electrical power from said power supply to said sensor, the wire including a conductive portion and a non-conductive portion, the non-conductive portion being integrally formed by said light channel; and
   a system processor connected to each sensor of each of said plurality of vehicle lamp by said light channel, said system processor adapted to further process data transmitted away from said sensor by said light channel.

16. The vehicle lamp of claim 1, wherein the bulb shield is structured to re-direct light from the bulb to the reflective surface.

17. The vehicle lamp of claim 16, wherein the bulb shield has a reflective interior surface.

* * * * *

UNITED STATES PATENT AND TRADEMARK OFFICE
CERTIFICATE OF CORRECTION

PATENT NO.     : 6,821,003 B2
DATED          : November 23, 2004
INVENTOR(S)    : Jay DeAvis Baker et al.

It is certified that error appears in the above-identified patent and that said Letters Patent is hereby corrected as shown below:

Title page,
Item [75], Inventors, delete "Jimmy Attard," and substitute -- Joe Attard -- in its place.

Column 6,
Line 19, after "first" delete "end" and substitute -- and -- in its place.

Signed and Sealed this

Third Day of May, 2005

JON W. DUDAS
*Director of the United States Patent and Trademark Office*